R. D. WAGNER.
EXPANSION SOCKET.
APPLICATION FILED JAN. 16, 1912.
1,168,770.
Patented Jan. 18, 1916.
6 SHEETS—SHEET 1.
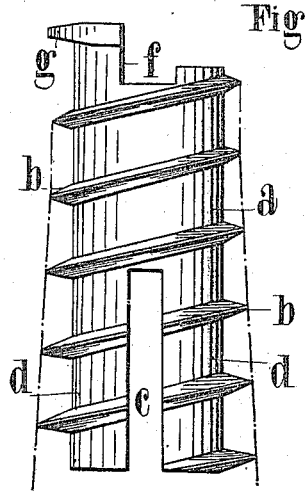
Fig. 1.
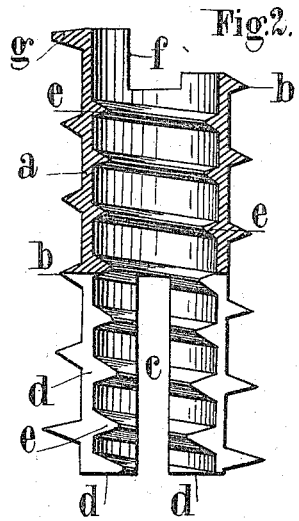
Fig. 2.
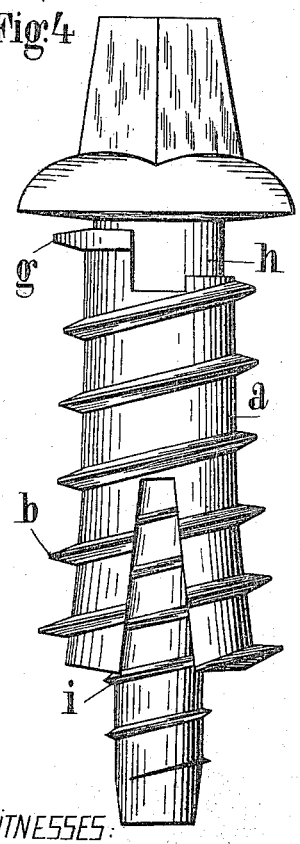
Fig. 4.
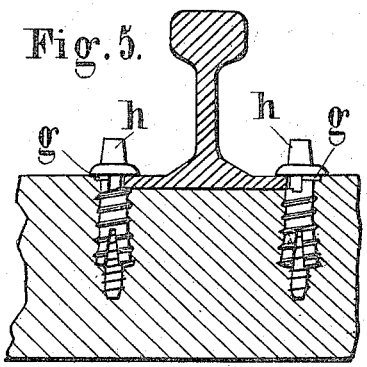
Fig. 5.
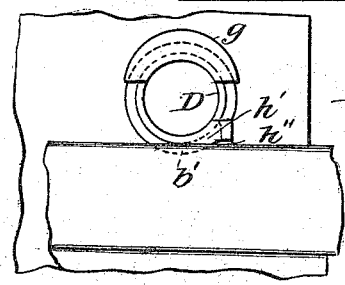
Fig. II.b
WITNESSES:
Olive D. White
Helen S. Morris
INVENTOR
Raoul Diaz Wagner
BY
Emil Boinelycke
ATTORNEY R. D. WAGNER.
EXPANSION SOCKET.
APPLICATION FILED JAN. 16, 1912.
1,168,770.
Patented Jan. 18, 1916.
6 SHEETS—SHEET 2.
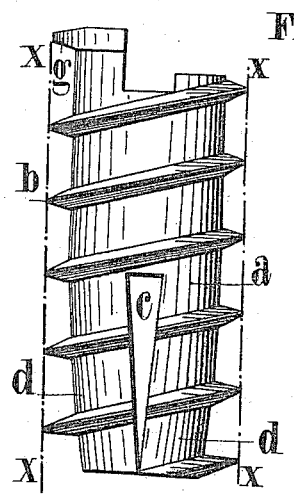
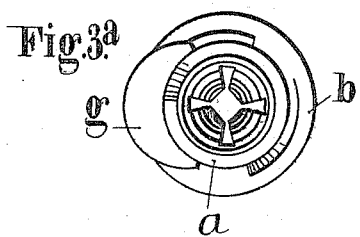
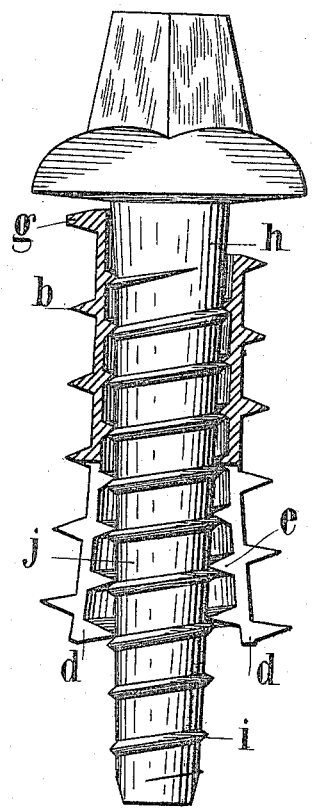
WITNESSES:
Olive D. White
Helen S. Morris
INVENTOR
Raoul Diaz Wagner
BY
ATTORNEY

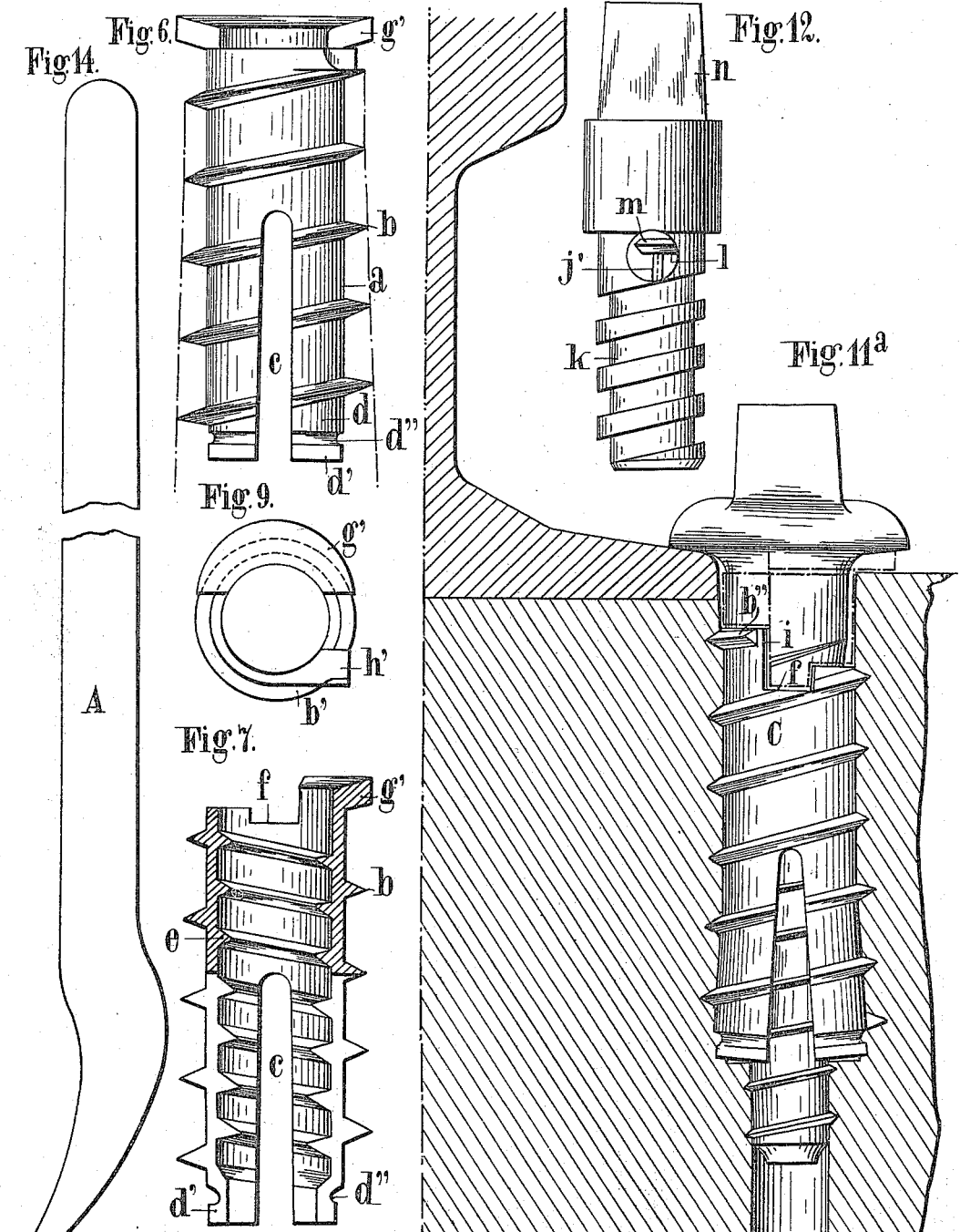

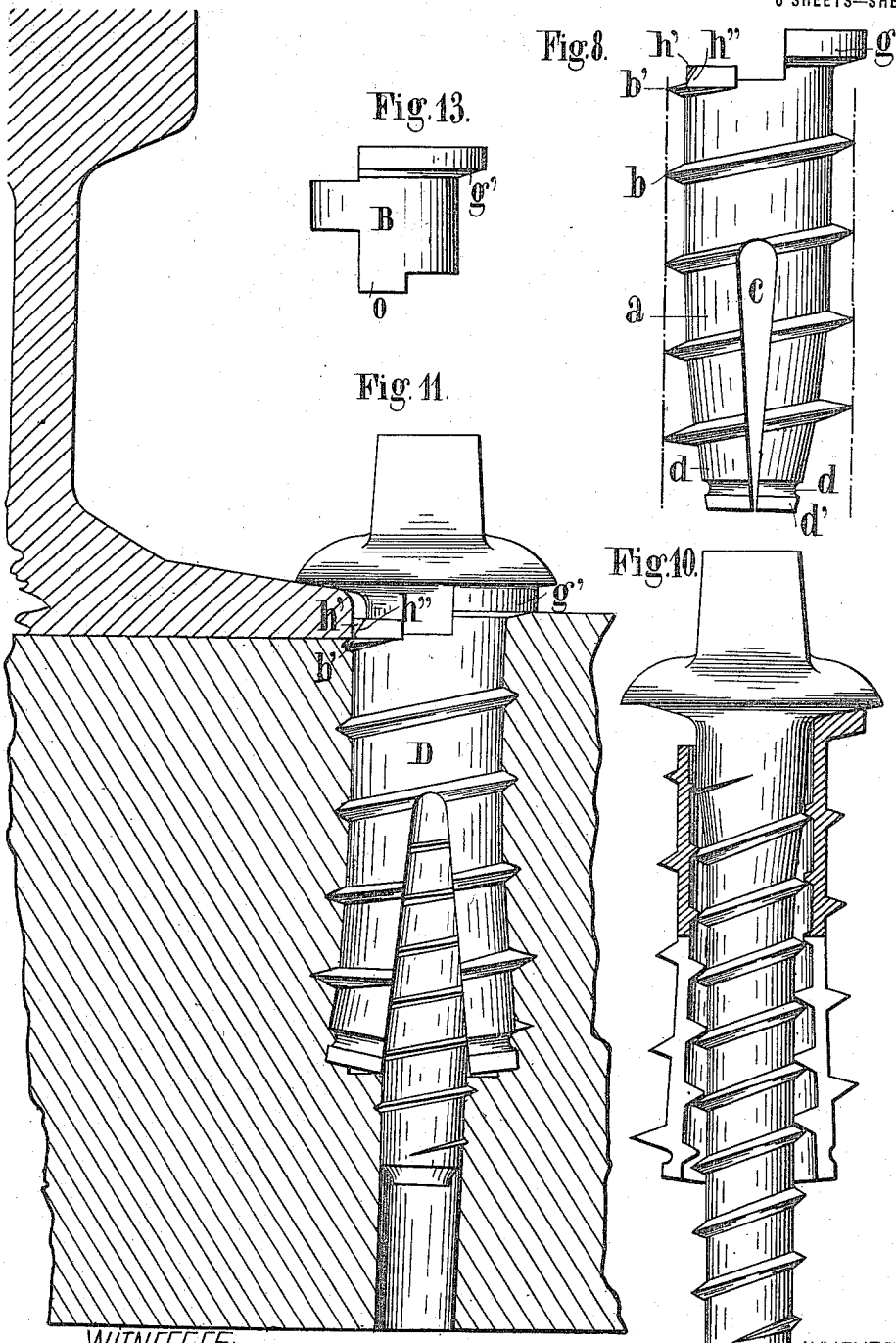

R. D. WAGNER.
EXPANSION SOCKET.
APPLICATION FILED JAN. 16, 1912.
1,168,770.
Patented Jan. 18, 1916.
6 SHEETS—SHEET 5.
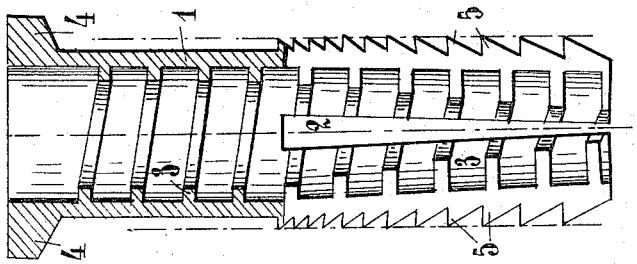
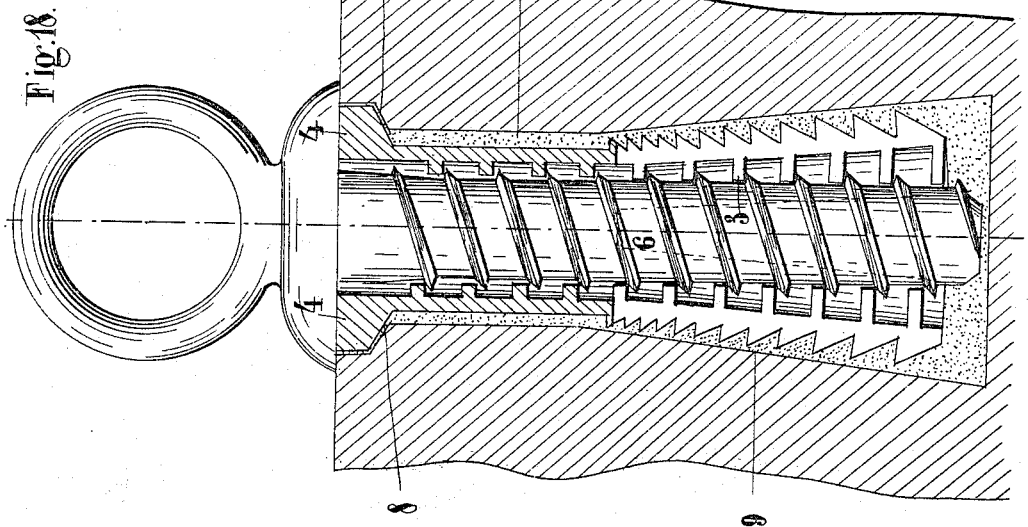
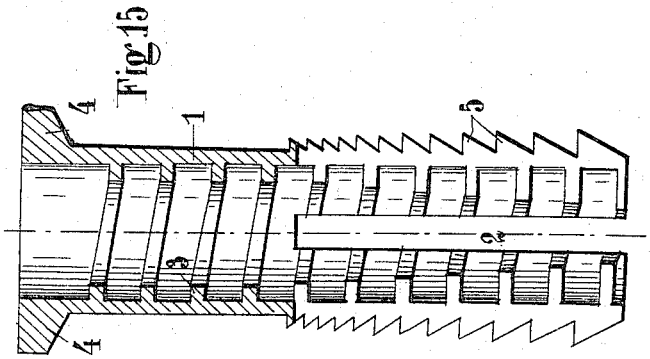
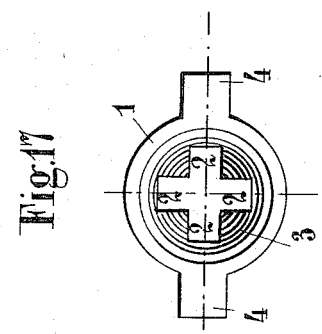
WITNESSES
Olive D. White
Helen S. Morris
INVENTOR
Raoul Diaz Wagner
BY
Daniel Boinetiche
ATTORNEY

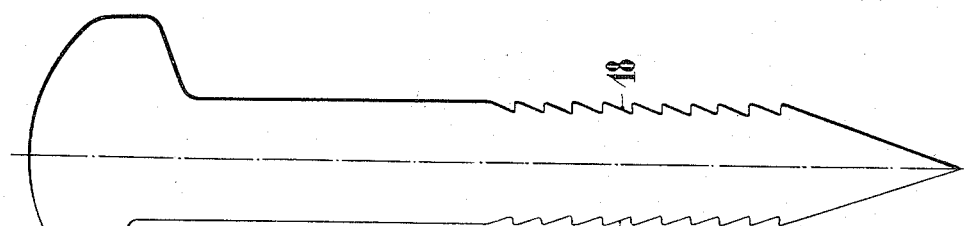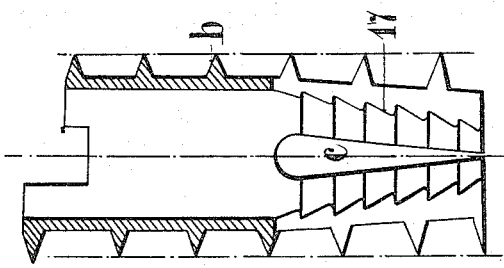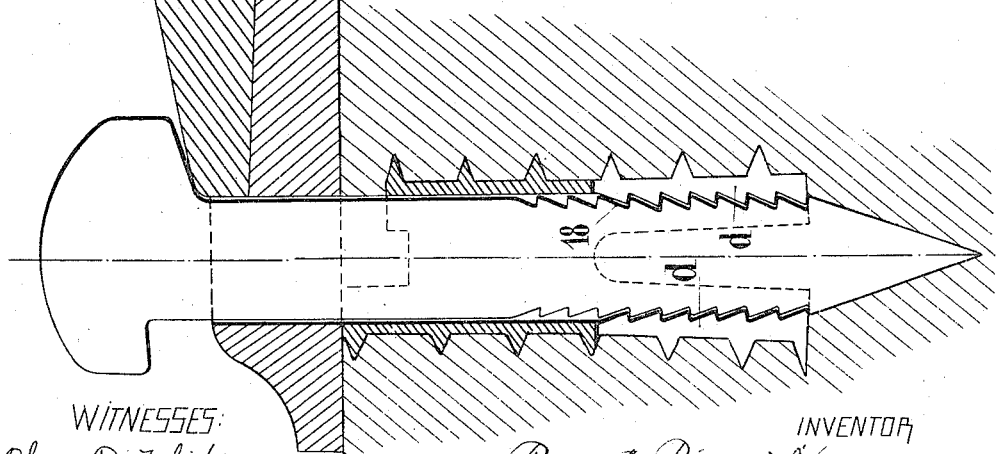

UNITED STATES PATENT OFFICE.

RAOUL DIAZ WAGNER, OF PARIS, FRANCE.

EXPANSION-SOCKET.

1,168,770.  Specification of Letters Patent.  Patented Jan. 18, 1916.

Application filed January 16, 1912. Serial No. 671,493.

*To all whom it may concern:*

Be it known that I, RAOUL DIAZ WAGNER, a citizen of the Republic of France, and resident of Paris, France, have invented new and useful Improvements in Expansion-Sockets, which improvements are fully set forth in the following specification.

The present invention relates to bolts presenting an opening and intended more particularly for insuring the fixing of rails to wooden sleepers while extending the life of the said sleepers in view of the possibility that they afford of fixing screws under the best conditions in holes which are already worn the wood surrounding them being strained.

It is known that the employment of screws for fixing the rails of rail roads to the wooden sleepers present the defect of rapidly deteriorating these sleepers owing to the various shocks that the screws experience by the disaggregation of the wood resulting from these repeated shocks and by the rotting of the wood which subsequently takes place in proximity to the screws by the introduction of water. At the end of a certain period of time the screws are no longer afforded any hold in the strained and rotten wood and the fixing of the rails is absolutely defective.

The device which is contemplated by the present invention obviates this defect and, apart from prolonging the life of hard wood sleepers, enables the screws to be used with soft wood sleepers. Furthermore this bolt which is hollow is adapted for fixing wood screws of any kind and dimensions in strained or rotten wood or in soft wood and, generally speaking, in any other material which presents little or no resistance to the threads of the screw.

In order that the invention may be readily and clearly understood the bolt nut is illustrated by way of example in the accompanying drawing as applied to fixing railway rails.

Figure 1 is an elevation giving external details of the bolt nut. Fig. 2 is a vertical section showing the external and internal details. Fig. 3 shows the bolt in elevation before fitting. Fig. 3ª is a plan corresponding to Fig. 3. Fig. 4 is an elevation after fitting, the screw having been screwed in and caused the device to spread. Fig. 4ª is a vertical longitudinal section of Fig. 4. Fig. 5 is a view to a smaller scale showing the utilization of the device. Fig. 6 is an elevation giving the external details of a modified form of the bolt nut. Fig. 7 is a vertical section showing the external and internal details. Fig. 8 is an elevation of the same bolt-nut before fixing. Fig. 9 is a plan view of Fig. 6. Fig. 10 is a vertical section of the nut after fixing, the wood screw having been screwed-in thus causing the device to spread. Fig. 11 is a general view showing the method of fixing the rails by means of the bolt-nut. Fig. 11ª represents a modified form of bolt-nut in position on the rail. Fig. 11ᵇ is a plan view of the form shown in Fig. 11, with the bolt removed. Fig. 12 is an elevation of a device enabling this modified arrangement of bolt to be fixed beneath the plane in which the rail chairs are fixed. Fig. 13 is an elevation of a member employed in conjunction with this bolt. Fig. 14 is an elevation of a tool serving for withdrawing the bolt-nut. Fig. 15 is a vertical section illustrating another modification of the bolt-nut. Fig. 16 is a view of the device illustrated in Fig. 15, before fixing. Fig. 17 is a plan corresponding to Fig. 15. Fig. 18 is a vertical section of this modification showing the method of fixing a ring in a stone block or mass. Fig. 19 is a vertical section of a modified form of bolt-nut intended to improve the method of fixing rails on wooden sleepers by means of spikes. Fig. 20 is an elevation of a spike suited for this method of fixing. Fig. 21 shows the application of the bolt-nut illustrated in Fig. 19.

The improved bolt nut or socket is formed of a piece of hollow metal *a*, cylindrical internally and externally throughout its entire height as shown in Figs. 1 and 2. Externally a thread *b* the projection of which increases toward the bottom of the bolt or socket is formed throughout the entire height. Longitudinal slots *c* of a certain width and preferably four in number extend from the lower extremity to approximately half the height of the bolt; in this manner four branches *d* are formed but it will of course be understood that by increasing or decreasing the number of slots *c* a larger number of branches may be constituted. Inside the body-portion *a* a special thread *e* is formed which is perfectly cylindrical throughout the whole of the closed portion of the bolt, that is to say, to the point at which the slots *c* commence; from this point the thread *e* becomes conical and the threads progressively increase in internal projection without the pitch being altered. The upper part is cut away at $f$ so that the body portion of the bolt may be acted upon by a suitable spanner or tongs for the purpose of screwing it in. Finally at $g$ at the upper end of the part $a$ a shoulder is formed against which the head of the screw fits.

The bolt or socket which when completed has the cylindrical form represented in Figs. 1 and 2, after fitting presents a modification in form which consists in bringing the branches $d$ together at their free extremity. The end of the bolt thus becomes conical as shown in Fig. 3 but the external thread has been formed in such a manner that after the branches have been brought together the projections of the external thread are contained in a perfect cylinder $x$ as shown in Fig. 3; the advantage of this is that when the bolt opens owing to the introduction of the screw as shown in Figs. 4 and 4$^a$, an anchoring is formed by the penetrations of the fractions of the lower spirals of the bolt into the wood. In these conditions when, after being a certain time in use, a screw $h$ (Figs. 4 and 5) fitted in the usual manner acquires play in the sleeper owing to strain and rotting of the surrounding wood, after the screw has been removed the rotted wood is removed by means of an auger and in the hole thus formed the bolt or socket $a$ is screwed which then presents the cylindro-conical form with cylindrical external thread as shown in Fig. 3. In order to effect this operation successfully a suitable spanner or a special pair of tongs or an ordinary spanner is used for acting upon the part by the intermediary of a mandrel of suitable form.

When the part $a$ occupies the hole in the sleeper in which it tightly fits by means of its outer thread $b$ the end of the screw $h$ is engaged with the body portion $a$ and this screw is screwed in in the ordinary manner. The thread $i$ of the screw comes into contact with the lower part of the inner thread $e$ of the bolt, the projection of this thread being such that the ridge of the screw does not come into contact with the wall of the bolt $a$. In continuing to screw the screw in, it engages progressively in the body of the part $a$ which is at first cylindrical and then in its conical part in such a manner that when the extremity of the screw comes level with the slots $c$ the branches $d$ separate under the internal pressure of the screw, the body $j$ of which bears upon the threads $e$. This separation is accentuated in proportion as the screw enters the conical portion owing to the progressive increase in the thickness of the thread $e$ in such a manner that at the end of the operation the lower part of the bolt is inversely conical (Fig. 4) as compared with the form that it presented before fitting (Fig. 3). Owing to the spreading of the branches $d$ which enter the wood in which they become anchored by the threads $b$ the fixing of the screw is insured by the intermediary of the bolt $a$. At this moment the head of the screw bears against the shoulder $g$ of the part $a$, which (as shown in Fig. 5) prevents the head of the screw from being deflected in the opposite direction to that of the rail, the head encountering sufficient resistance in the shoulder $g$. The shoulder bearing flat against the sleeper also serves to prevent the nut from being screwed in more deeply.

The method of fitting screws into hard wood sleepers which has just been described is equally applicable, without altering in any way the operative method, to the initial fitting of the screws into soft wood sleepers.

The invention is applicable to other purposes—for example for fixing screws in woods of all kinds and all cuts in strained or rotted hard wood, or into soft wood or in any other material presenting but little or no resistance for the screw threads; the upper extremity or head of the bolt can be modified to permit of screwing it in by means of appropriate tools.

As in the preceding embodiment of the invention the nut or socket (Figs. 6 and 7) consists of a hollow body $a$ cylindrical externally and internally and comprising an internal screw thread $e$ and an external screw thread $b$ which are precisely similar to those previously described. It also comprises at its lower part slots $c$ forming branches $d$ and at its upper part diametral notches $f$ enabling the bolt to be screwed home by means of a spanner. At the upper part and on one side only of the slots $f$ a shoulder $g'$ is formed in the manufacture and constitutes a cup at the upper end in such a manner as to exactly follow the form of the lower part of the head of the screw (Fig. 10). The head of the bolt-nut forming the part diametrically opposite to the shoulder $g'$ extends to a point slightly lower than this shoulder in such a manner that, the nut and its screw being in place, the last external thread $b'$ comes exactly beneath the base of the rail as shown in Fig. 11.

Above the end of the thread $b'$ a small shoulder is formed comprising a rectangular portion $h'$ which bears against the base of the rail and limits the rotation of the nut or socket. Said shoulder terminates at its free end in a beveled portion $h''$ which forms a knife edge along a portion of the base of said shoulder and is intended to cut into the wood of the rail tie, so as to facilitate the fixing of the socket, where the surface of the rail tie tends to prevent the even seating of the shoulder $h'$.

At the lower part of the bolt-nut each of the branches $d$ terminates in a plane portion $d'$ above which a groove $d''$ is formed which serves to permit of closing and withdrawing the bolt-nut. The hole intended for the reception of the bolt being formed right through the piece of wood, and the wood screw being unscrewed, in order to withdraw the bolt-nut the branches *d* are brought together (by acting on the under side of the sleeper) by means of the tool A (Fig. 14), the end of which is engaged in the grooves *d"* and the bolt-nut is brought to the form represented in Fig. 8; in this position the unscrewing can be effected normally by means of an appropriate spanner.

It may be necessary that the bolt nut or socket should not come flush with the plane in which the rail chairs are fixed. In this case it will present the form represented in Fig. 11ª that is to say, it does not include the shoulder *g'*. The head of the bolt is cut off at the top of the external thread *b"*, which is interrupted somewhat in front of the slightly beveled vertical side of the notch *f*.

In order to insert the bolt-nut the device represented in Fig. 12 is utilized; this consists of a body portion *k* having a thread of the same pitch as the interior of the bolt-nut and which is screwed into the bolt until the snug or cross-piece *l* which it removably carries in a transverse socket bears against the ridge or side *i*, the undercut projection *j'* of the snug being beveled in the opposite direction to the ridge *i* so that it fits the latter exactly. At its upper part the snug carries a small fraction of the screw *m* which overlaps the wall of the screw and conformingly abuts the extremity of the thread *b"* of the thread of the bolt when the bevels *j'* and *i* interfit. The part is completed by a square head *n* or head of some other form which permits of the employment of a spanner.

The bolt-nut or socket which has just been described does not comprise a shoulder *g'* at the upper part and the head of the wood screw bears only on the rail so that it might be deflected in the opposite direction. In order to obviate this defect the member B represented in Fig. 13 may be employed. This member consists of a semi-cylindrical sleeve comprising at its lower part a shoulder *o* presenting the same form as the notch *f* and at its upper part a shoulder *g'* similar to that of the bolt-nut represented in Figs. 1 to 5. The member B is placed above the bolt-nut C with the portion *o* in the notch *f* and the shoulder *g'* opposite the rail as shown in broken lines in Fig. 11ª, and in this manner completes the nut or socket C so that it possesses all of the properties of the one piece nut or socket D.

It is obvious that the bolt C may be employed with or without the part B.

The bolt-nut and the modifications that have just been described are particularly intended to be fixed in wood or other material offering but little or no resistance to screw threads but provided it be modified in some particulars it may equally well be employed for fixing parts of any kind in hard bodies such for example as rock, hewn stone, brick or other bodies in which screwing cannot be effected. In this case the bolt nut consists as before of a cylindrical body 1 (Figs. 15, 16 and 17) comprising longitudinal slits 2 in the lower half. Internally it comprises a thread 3 which may be either square or triangular and which is perfectly cylindrical throughout the whole of the closed portion of the bolt and increases progressively in projection toward the lower part. Externally the bolt comprises two lugs 4 at the upper part and circular channels progressively increasing in depth toward the lower part throughout the whole of the open portion. The part which is to be fixed by means of this bolt-nut, and which may be of any kind such as a ring, (Fig. 18) a metal bar, an angle piece or the like, comprises a threaded portion 6 (with either square or triangular threads) of the same pitch as the interior of the bolt. The housing formed in the stone or other body comprises a cylindrical portion 7 corresponding to the height of the closed portion of the bolt and at the entrance two cavities 8 for the reception of the lugs 4. The lower part 9 of the housing flares downward.

The bolt-nut alone is introduced into its housing the lugs 4 being arranged in the cavities 8. The part to be fixed is then screwed into the bolt-nut; this causes its lower portion to spread insuring the fixing of the bolt and of the part carried by it; a cement of any suitable kind can then be poured in the housing 9. Finally the bolt-nut as contemplated by this invention may be employed for insuring the fixing in wooden sleepers of the spikes that are sometimes used for fixing the rails to the said sleepers. This use of the bolt-nut obviates the defects arising from the employment of spikes. The wood is not injured and the penetration of the spike takes place normally to the sleeper. Furthermore the screwing of the bolt nut is utilized by means of a special device for insuring the connection between the bolt-nut and the spike and the anchoring of the latter in the sleeper.

The bolt-nut (Fig. 19) comprises an external threading *b* previously described. On the interior, starting at a level with the slot *c* the wall of the nut itself increases in thickness toward the lower extremity and this wall comprises teeth 17.

The spike (Fig. 20) of square section presents on two of its faces or on all four faces notches 18 (which may be formed by any suitable method upon existing spikes) formed oppositely to the teeth 17 of the bolt-nut and in such a manner as to engage therewith.

When the bolt nut is screwed into the sleeper (Fig. 21) the spike is driven in and the inclined plane of the first teeth 18 on the spike speedily comes into contact with the inclined plane of the teeth 17 on the nut so that as the spike is driven in the branches *d* are separated and spread in the wood of the sleeper.

When the spike has been completely driven-in the teeth 18 have passed to the other side of the teeth 17 as shown in Fig. 21 thereby insuring the anchoring of the spike.

What I claim and desire to secure by Letters Patent of the United States is:—

1. An expansion fastening, comprising in combination, a hollow body solid at its upper end and split at its lower end, said split lower end consisting of several expansible and contractible elements, an external wood thread extended throughout the length of the body, an internal thread independent of said external thread also extending from top to bottom of said body, and a bolt adapted to be screwed into said hollow body and having a body portion adapted to bear against said internal thread with expansion pressure, the cutting edge of the entire external thread lying substantially in a cylindrical curve when the expansion elements are contracted and lying in a conchoidal curve when said expansible elements are expanded into the wood when said bolt is screwed into the hollow body.

2. An expansion socket, comprising a hollow body split at its lower end and solid at its upper end, an external screw flange extending the entire length of the body, said split lower end constituting a plurality of expansion members which may be bent inwardly when said body is screwed into an opening therefor, an internal screw flange extending throughout the length of said body, a sleeve member fitted to the upper end of said body and a shoulder at the end of said sleeve member adapted to support one side of the head of a bolt screwed into the socket.

3. An expansion fastening comprising a hollow body split at its lower end and solid at its upper end, an external thread of uniform depth on the solid portion and increasing in diameter downwardly from an intermediate point to the bottom of said body, and an internal thread formed on said body but being absolutely independent from the first mentioned thread, also projecting progressively from an intermediate point to the bottom of said body, the said lower split portion constituting several extensible elements adapted to be contracted inwardly when said body is screwed into a hole and to be expanded into the material when an expanding member is passed through said body.

4. An expansion fastening, comprising in combination, a hollow body split at its lower end and solid at its upper end, an external thread extending throughout the length of the body, and internal projections formed on said body, the lower split portion constituting several expansible elements adapted to be contracted inwardly when said body is screwed into a hole and to be expanded into the material when an expanding element is passed through said body, and the cutting edge of the external thread adapted to lie substantially in a cylindrical curve when the expansion elements are contracted and to lie in a conchoidal curve when said expansible elements are expanded into the material by the projection of said expanding element through the body.

5. An expansion fastening, comprising a hollow body split at its lower end and solid at its upper end, a series of external projections extending from the bottom of said body toward the top thereof, and internal projections also formed on said body, said split lower end constituting several expansible elements adapted to be contracted inwardly to prepare said body for insertion into a hole, and to be expanded into the material when an expanding element is passed through said body, the extremities of said external projections being adapted to lie substantially in a cylindrical curve when the expansion elements are contracted and to lie in a conchoidal curve when said expansible elements are expanded into the material.

In testimony whereof I have signed this specification in the presence of two subscribing witnesses.

RAOUL DIAZ WAGNER.

Witnesses:
 EMILE LEDRET,
 H. C. COXE.